US012803446B2

(12) United States Patent
Tang et al.

(10) Patent No.: US 12,803,446 B2
(45) Date of Patent: Nov. 17, 2026

(54) POWER DELIVERY CONTROL AND OVER CURRENT PROTECTION

(71) Applicant: Infineon Technologies Austria AG, Villach (AT)

(72) Inventors: Benjamim Tang, Rancho Palos Verdes, CA (US); Vicky Bidawat, Sunnyvale, CA (US); Richard C. Pierson, Lakewood, CA (US); Yifei Zheng, Cypress, CA (US); Hongying Ding, Redondo Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 270 days.

(21) Appl. No.: 18/379,742

(22) Filed: Oct. 13, 2023

(65) Prior Publication Data

US 2025/0125730 A1 Apr. 17, 2025

(51) Int. Cl.

*H02M 3/335* (2006.01)
*H02M 1/00* (2006.01)
*H02M 3/00* (2006.01)

(52) U.S. Cl.

CPC ..... *H02M 3/33507* (2013.01); *H02M 1/0025* (2021.05); *H02M 3/01* (2021.05)

(58) Field of Classification Search

CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569

See application file for complete search history.

(56) References Cited

U.S. PATENT DOCUMENTS

| | | | | |
|---|---|---|---|---|
| 2020/0112241 | A1 * | 4/2020 | Wang ................ | H02M 3/33523 |
| 2024/0235403 | A1 * | 7/2024 | Nakanishi ......... | H02M 3/33569 |

* cited by examiner

*Primary Examiner* — Bryan R Perez

(74) *Attorney, Agent, or Firm* — Armis IP Law, LLC

(57) ABSTRACT

A power supply as discussed herein includes a controller. The controller receives an output voltage feedback signal outputted from a resonant power converter. The output voltage feedback signal tracks a magnitude of an output voltage outputted from the resonant power converter to power a load. An error voltage generator generates an error voltage signal based on a comparison of the output voltage feedback signal to a setpoint reference voltage. The output voltage feedback signal derives a control period setting from an error voltage. The controller controls switching of switches in the resonant power converter in accordance with the derived control period setting.

20 Claims, 14 Drawing Sheets

$$e(t) = vref(t) - vout(t)$$

$$X = pid(t) = K_p e(t) + K_i \int_0^t e(\tau)d\tau + K_d \frac{d\,e(t)}{dt}$$

$$F(t) = K_0 \frac{p_0}{pid(t)}$$

$$P(t) = \frac{1}{F(t)} = \frac{1}{K_0}\frac{pid(t)}{p_0} = T_0(1 + k_1(pid(t) - p_0))$$

POWER SUPPLY 100

$$e(t) = vref(t) - vout(t)$$

$$pid(t) = K_p e(t) + K_i \int_0^t e(\tau)d\tau + K_d \frac{d\,e(t)}{dt}$$

$$P(t) = K_1 \frac{pid(t)}{p_0} = T_0(1 + k_1(pid(t) - p_0))$$

FUNCTION 440

$$F(t) = \frac{1}{P(t)} = \frac{1}{T_0(1 + k_1(pid(t) - p_0))} = \frac{F_0}{(1 + k_1(pid(t) - p_0))}$$

POWER DELIVERY CONTROL AND OVER CURRENT PROTECTION

BACKGROUND

Popular resonant converters topologies include series resonant converters, parallel resonant converters, and series-parallel resonant converters such as LCC (such as Inductor-Capacitor-Capacitor) and LLC (such as Inductor-Inductor-Capacitor) converters. In general, an LLC converter is a DC/DC converter based on a resonant circuit which allows soft-switching operation. The conventional LLC resonant circuit can be configured to reduce switching loss through zero-voltage switching (ZVS). The conventional LLC converter also can be configured to maintain regulation of an output voltage even under light load conditions.

It is further noted that a general implementation of a so-called LLC converter is a resonant converter where the DC input voltage is turned into a square wave by a switch network arranged as either a half-or full-bridge feed the resonant LLC tank. The tank circuit filters out harmonics and provides a sinusoidal like voltage and current waveform feeding a transformer and subsequent rectifier circuit. The secondary winding of the transformer outputs a signal that is rectified to produce a DC output voltage.

BRIEF DESCRIPTION

Implementation of clean energy (or green technology) is very important to reduce human impact on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator or voltage source.

Regardless of whether energy is received from green energy sources or non-green energy sources, it is desirable to make most efficient use of raw energy provided by such sources to reduce our impact on the environment. This disclosure contributes to reducing our carbon footprint and providing better use of energy via more efficient energy conversion.

This disclosure further includes the observation that conventional resonant converters, such as those of the LLC, series resonant, parallel resonant, series-parallel types, can provide a high conversion efficiency, but traditionally have not provided high bandwidth, due to the varying dynamic of a resonant tank that is a part of the resonant circuity.

Poor control strategies may exhibit spikes in the closed-loop output impedance at or near the switching frequency of the converter, resulting in a need to limit the gain or loop bandwidth to avoid instabilities, fluctuating output voltages, or outright regulation failure in delivering a regulated voltage to a load device.

Examples herein include methods and/or hardware for improving and/or simplifying resonant power converter control. It is noted that since the LLC topology voltage gain is non-linear, using the standard linear PID/PFM control is not always desirable. To provide improvement over conventional techniques, one or more examples herein include Time Modulation (i.e. modulate the period instead of frequency) associated with a variable frequency oscillator (such as voltage controlled oscillator), taking advantages of its inverse relationship to provide more optimal gain across the different regulation points.

Examples as discussed herein address the known limitations of Pulse Frequency Modulation (PFM) or Direct Frequency Control (DFC). The principle here is that having nonlinear gain, in this case using the inverse relationship between control and frequency provided by Time (period) modulation instead of Frequency Modulation, provides significant improvements over the traditional linear direct frequency control.

More specifically, in one example, a power supply system as discussed herein includes a resonant power converter and corresponding controller. In accordance with one example, the controller receives an output voltage feedback signal outputted from a resonant power converter. The output voltage feedback signal tracks a magnitude of an output voltage outputted from the resonant power converter to power a load. An error voltage generator generates an error voltage signal based on a comparison of the output voltage feedback signal to a setpoint reference voltage. The output voltage feedback signal derives a control period setting from an error voltage. The controller controls switching of switches in the resonant power converter in accordance with the derived control period setting.

In one example, the controlled switching of the switches in the resonant power converter in accordance with the derived control period setting provides non-linear frequency gain of regulating a magnitude of the output voltage with respect to changes in the error voltage. The non-linear frequency gain of regulating the magnitude of the output voltage based on the error voltage may be operative to provide lower control loop gain for below-resonance operation of the resonant power converter and higher control loop gain for above-resonance operation of the resonant power converter.

Yet further, in another example, a conversion of the error voltage into the derived control period setting is operative to provide a non-linear frequency response of controlling the switches in the resonant power converter.

Still further, the controller as discussed herein can be configured to implement a feedback control loop in which a magnitude of the error voltage is used to produce the control period setting of controlling the switches. The feedback control loop may include an inverse function. The inverse function is operative to receive a processed rendition of the error voltage from a PID function as signal X and output a signal Y. The output signal $Y=K/X$, where K is a selected gain value. The feedback control loop further includes a voltage controlled oscillator function operative to derive the control period setting of controlling the switches based at least in part on the signal Y and a nominal switching frequency setting.

The controller can be configured to implement a feedback loop including a linear PID (Proportional-Integral-Derivative) controller operative to produce a processed rendition of the error voltage to derive the control period setting.

In accordance with further examples, the controller as discussed herein can be configured to receive a nominal switching frequency value and adjust (such as increase or decrease) a magnitude of the nominal switching frequency value to produce the derived control period setting based on a received adjustment signal Y (positive or negative value) derived at least in part from the error voltage. The error voltage is processed by a first control loop function to produce signal X. The controller is operative to apply a second control loop function to convert signal X into the adjust signal Y, the second control loop function including an inverse function. The controller is further operative to produce a signal Z based on a combination (such as summation) of the nominal switching frequency setting value and the adjustment signal Y. The controller can be further operative to apply a third control loop function including a voltage controlled oscillator function to convert signal Z into the derived control period setting.

In accordance with further example embodiments, the controller as discussed herein can be configured to implement: i) a first function to convert the error voltage into a filtered error voltage, and ii) a second function to convert the filtered error voltage into the control period setting. The first function may be a PID function and the second function may be a linear conversion function mapping different settings of the filtered error voltage to different magnitudes of the control period setting.

These and other more specific examples are disclosed in more detail below.

As discussed herein, techniques herein are well suited for use in the field of supporting switching power supplies. However, it should be noted that examples herein are not limited to use in such applications and that the techniques discussed herein are well suited for other applications as well.

Yet other embodiments herein include software programs to perform the steps and operations summarized above and disclosed in detail below. One such embodiment comprises a computer program product including a non-transitory computer-readable storage medium or computer readable storage hardware on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive an output voltage feedback signal outputted from a resonant power converter, the output voltage feedback signal tracking a magnitude of an output voltage outputted from the resonant power converter to power a load: derive a control period setting from an error voltage, the error voltage generated based on a comparison of the output voltage feedback signal to a setpoint reference voltage; and control switching of switches in the resonant power converter in accordance with the derived control period setting.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
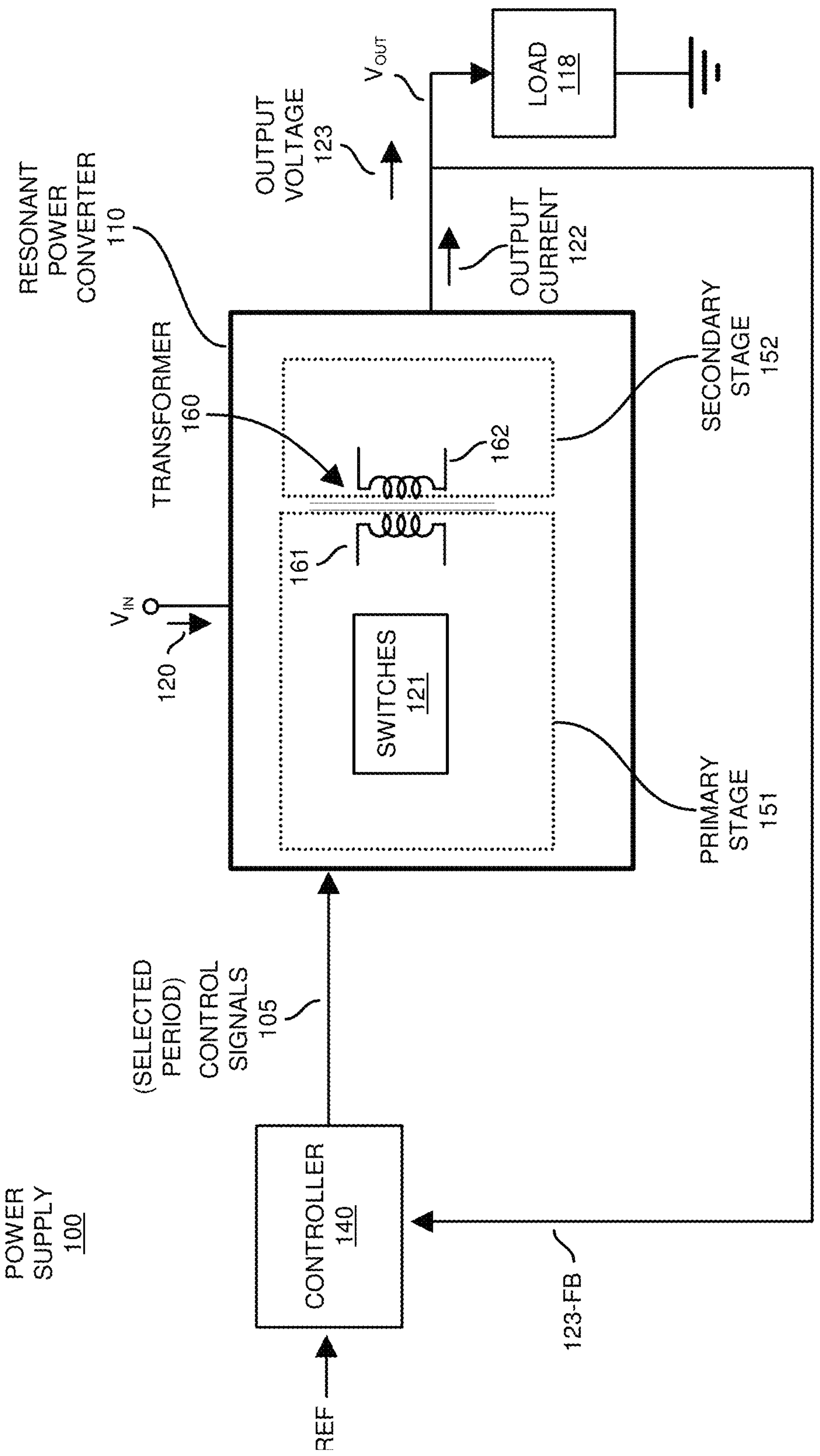
FIG. 1 is an example general diagram illustrating implementation of a controller and corresponding resonant power converter to convert an input voltage into an output voltage as discussed herein.

The foregoing and other objects, features, and advantages of the invention will be apparent from the following more particular description of examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

A power supply as discussed herein includes one or more resonant power converters to convert an input voltage into an output voltage. The controller receives an output voltage feedback signal outputted from the resonant power converter. The output voltage feedback signal tracks a magnitude of an output voltage outputted from the resonant power converter to power a load. An error voltage generator generates an error voltage signal based on a comparison of the output voltage feedback signal to a setpoint reference voltage. Via a linear mapping function, the controller derives a control period setting from the error voltage signal. The controller controls switching of switches in the resonant power converter in accordance with the derived control period setting.

Now, more specifically, FIG. 1 is an example general diagram illustrating implementation of a controller and corresponding resonant power converter to convert an input voltage into an output voltage as discussed herein.

As shown, the power supply 100 in FIG. 1 includes controller 140 and corresponding resonant power converter 110 to produce output voltage 123 and corresponding output current 122 to power the load 118.

The resonant power converter 110 includes a transformer 160. Transformer 160 includes primary winding 161 and secondary winding 162. The secondary winding 162 is magnetically coupled to the primary winding 161. In such an instance, changing current flowing through the primary winding 161 causes a corresponding flow of current through the secondary winding 162

The resonant power converter 110 further includes primary power converter stage 151 and secondary power converter stage 152. The primary power converter stage 151 includes switches 121 and primary winding 161. The secondary power converter stage 162 includes the secondary winding 162 of the transformer 160.

During operation, the resonant power converter 110 receives the input voltage 120 (a.k.a., Vin). The controller 140 controls operation of the resonant power converter 110 to convert the input voltage 120 into the output voltage 123 and corresponding output current 122.

More specifically, the controller 140 receives an output voltage feedback signal 123-FB outputted from the resonant power converter 110. The output voltage feedback signal 123-FB proportionally tracks a magnitude of the output voltage 123 outputted from the resonant power converter 110 to power a load 118. As further discussed herein, note that the controller 140 can be configured to include an error voltage generator that generates an error voltage signal based on a comparison of the output voltage feedback signal 123-FB to a setpoint reference voltage VREF. The controller 140 derives a control period setting from the error voltage signal. The controller 140 controls switching of switches 121 in the resonant power converter 110 in accordance with the derived control period setting.

Figure 2:
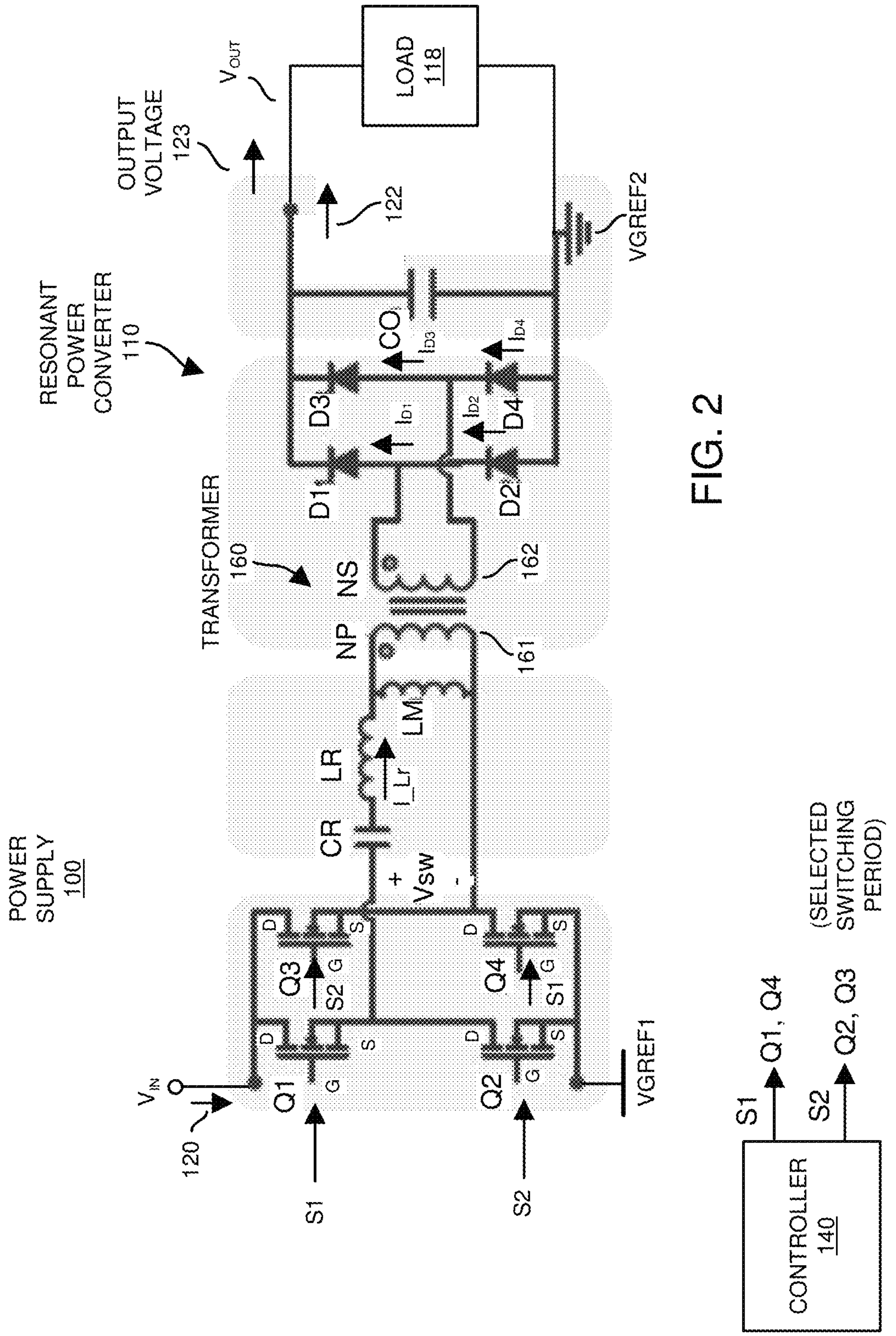
FIG. 2 is an example circuit diagram illustrating implementation of a controller and corresponding resonant power converter to convert an input voltage into an output voltage as discussed herein.

FIG. 2 is an example circuit diagram illustrating implementation of a controller and corresponding resonant power converter to convert an input voltage into an output voltage as discussed herein.

In this example, the resonant power converter 110 includes switch Q1, switch Q2, switch Q3, switch Q4, capacitor CR, inductor LR, transformer 160, diode D1, diode D2, diode D3, diode D4, and output capacitor CO. Switches Q1-Q4 can be implemented as field effect transistors or other suitable components.

Based on monitoring of the output voltage 123 via corresponding output voltage feedback signal 123-FB, the controller 140 selects a corresponding switching period to produce the control signals S1 and S2.

The control signal S1 drives the gate (G) of switch Q1 and the gate (G) of switch Q4. The control signal S2 drives the gate (G) of switch Q2 and the gate (G) of switch Q3.

A logic high signal of S1 causes the switches Q1 and Q4 to turn ON, providing a low impedance path between the respective source(S) and respective drain (D). A logic low signal of S1 causes the switches Q1 and Q4 to turn OFF, providing a high impedance path between the respective source(S) and respective drain (D).

A logic high signal of S2 causes the switches Q2 and Q3 to turn ON, providing a low impedance path between the respective source(S) and respective drain (D). A logic low signal of S2 causes the switches Q2 and Q3 to turn OFF, providing a high impedance path between the respective source(S) and respective drain (D).

In one example, the controller 140 produces the signal S1 to a high state when the signal S2 is set to a low state; the controller 140 produces the signal S2 to a high state when the signal S1 is set to a low state.

Figure 3:
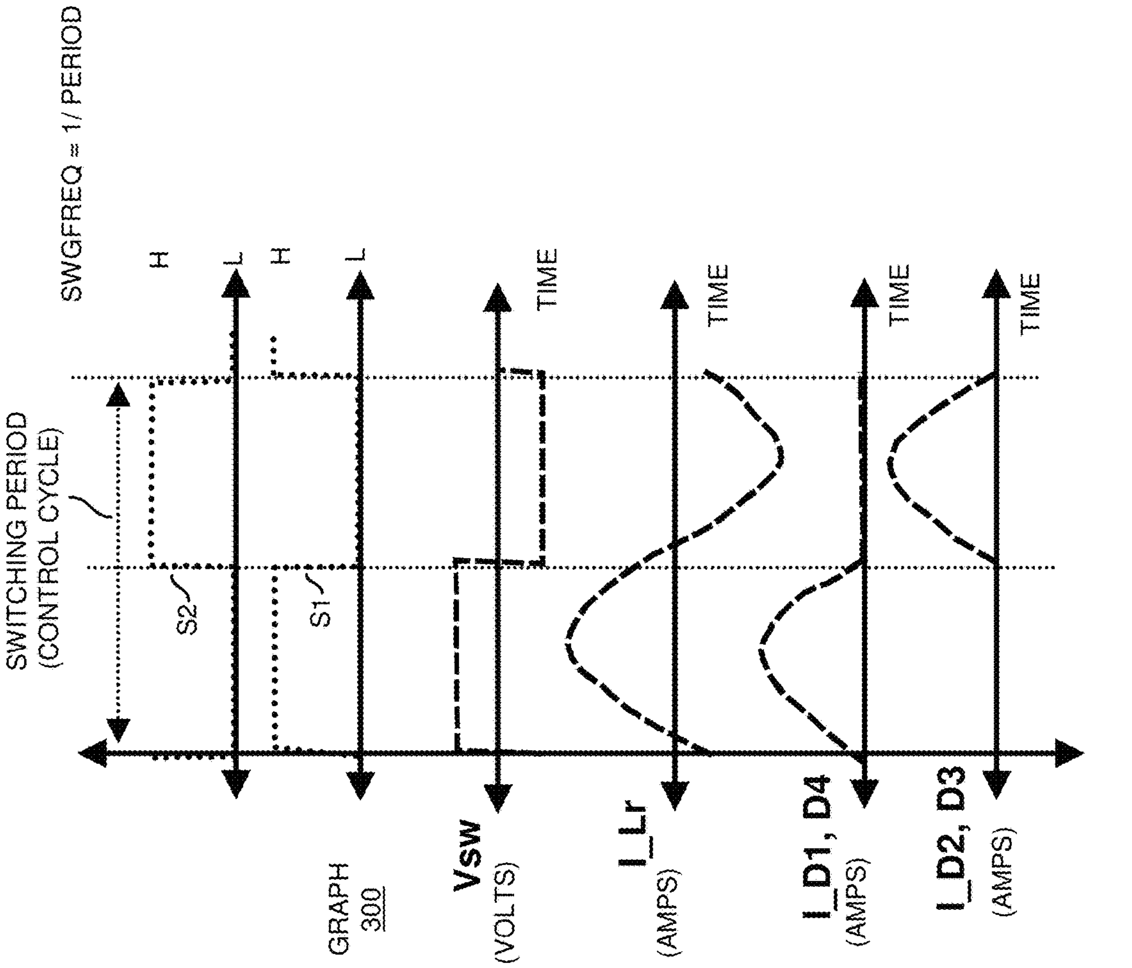
FIG. 3 is an example timing diagram illustrating switch control signals and magnitudes of currents in a power converter during conversion of an input voltage into an output voltage as discussed herein.

FIG. 3 is an example timing diagram illustrating magnitudes of currents in a power converter during conversion of an input voltage into an output voltage as discussed herein.

As shown in FIG. 3, the switching of the switches ON and OFF as previously discussed causes a flow of current I_Lr to flow through the primary winding 161. The flow of current through the primary winding 161 causes currents to flow through the secondary windings and corresponding diodes. For example, current Id1 flows through the diode D1; current Id2 flows through the diode D2; current Id3 flows through the diode D3; current Id4 flows through the diode D4. The output current 122 is the sum of Id1 and Id3.

As discussed herein, the controller 140 controls a magnitude of the switching period (a.k.a., duration of a respective control cycle) associated with signals S1 and S2 applied to corresponding switches Q1-Q4 as previously discussed.

Figure 4:
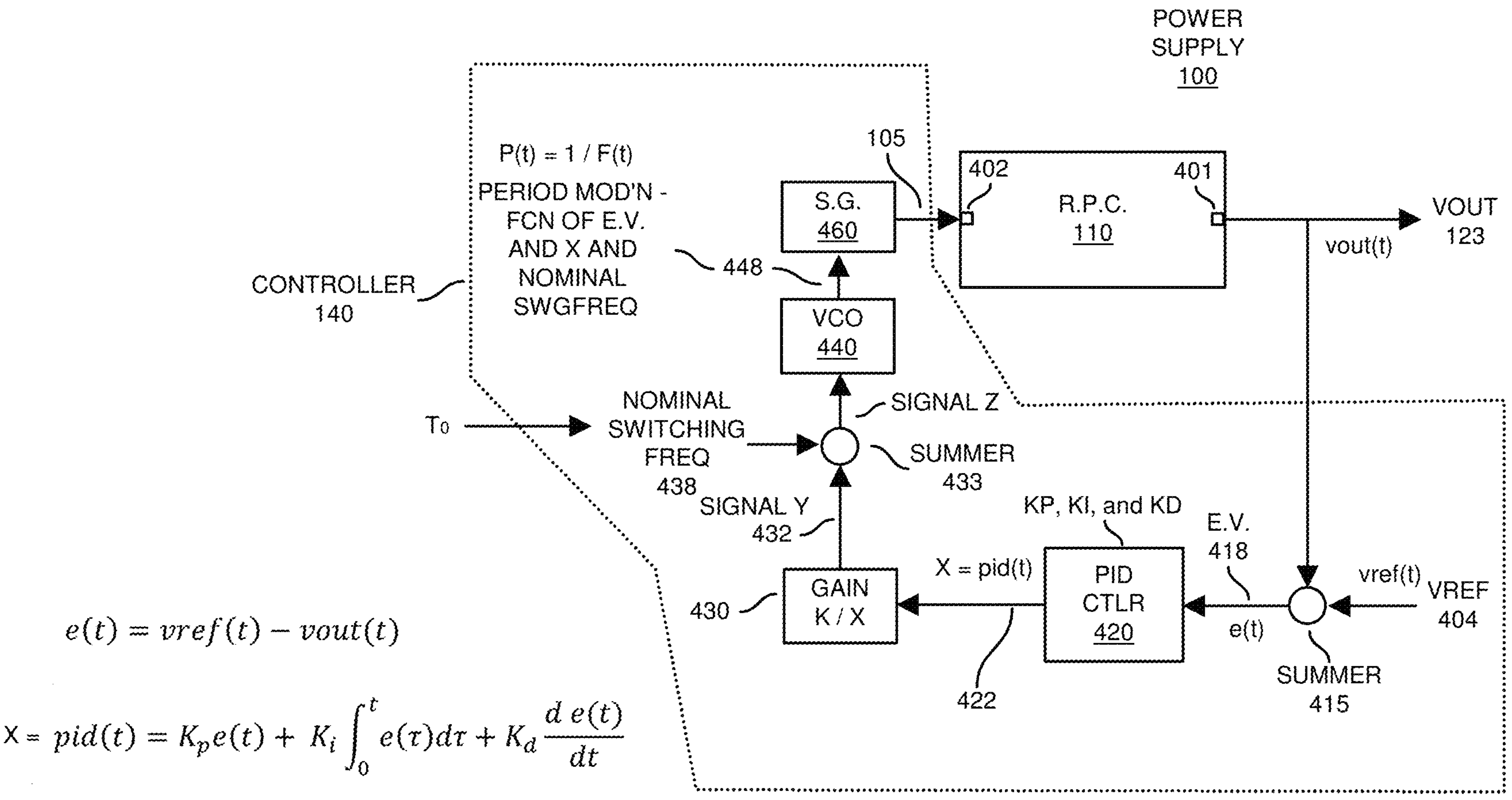
FIG. 4 is an example more specific detailed diagram illustrating an example resonant power converter and controller implementing switching period modulation as discussed herein.

FIG. 4 is an example more specific detailed diagram illustrating an example resonant power converter and controller implementing period modulation as discussed herein.

Examples herein include use of Time Modulation (i.e. modulate the period instead of frequency) of the variable frequency oscillator, taking advantages of its inverse relationship to provide more optimal gain across the different regulation points.

The power supply 100 in FIG. 4 is an example control loop block diagram. The voltage controlled oscillator 440 can be designed in the traditional manner as a frequency modulation (frequency is proportional to control), or as time modulation (period is proportional to control word). The gain of voltage controlled oscillator 440 ($\Delta f/\Delta v$) is different in frequency modulation and time period modulation.

Note that the PID gain of controller 420 can be adjusted accordingly too. In frequency modulation, the gain of a respective voltage controlled oscillator 440 is a constant. In time period modulation as discussed herein, the gain of the voltage controlled oscillator 440 varies with frequency (i.e., varying with control).

As further shown in this example, the power supply 100 includes a respective feedback loop such as circuit path from node 401 to node 402.

The feedback loop associated with controller 140 in this example includes summer 415, PID controller 420 (such as a linear PID or Proportional-Integral-Derivative stage where P=Proportional component, I=Integral component, D=Derivative component), gain stage 430, summer 433, and voltage controlled oscillator 440. The PID controller 420 implements coefficients $K_P$, $K_I$, and $K_D$ to convert the error voltage 418 into the output signal 422 (signal X such as PID output voltage or filtered error voltage or pid(t)). Accordingly, the signal 422 is a processed rendition of the error voltage 418.

Via the feedback control loop, the summer 415 (first control loop function) produces a respective error voltage 418 (a.k.a., error signal e(t)) based on VOUT-VREF, where VREF is signal 404. In general, as further discussed herein, the magnitude of the error voltage 418 is converted into a respective control period setting of control signal S1 and control signal S2 used to control respective switches Q1-Q4 as previously discussed.

As further shown, the PID controller 420 such as a second control loop function produces the respective signal 422 (such as signal X or pid(t) or PID output voltage). The feedback control loop further includes gain stage 430 (third control loop further comprising an inversion function) such as implementing gain K and an inverse function (1/X).

More specifically, as shown, the gain stage 430 receives the signal 422 (such as signal X or pid(t)) outputted from the PID controller 420. The gain stage 430 outputs a signal Y or signal 432 to summer 433, where the output signal Y=K/X, where K (a.k.a., $K_0$) is a selected gain value.

Note that the value $P_0$ (such as 0.5 or other suitable value) is the nominal value of the output pid(t) from controller 420 of the PID controller 420 when the error voltage 418 is zero. In one example, the magnitude of the signal 422 varies in a suitable range such as between 0 and 1.

As previously discussed, the feedback control loop as discussed herein further includes summer 433 (such as fourth control loop function), voltage controlled oscillator function 440, and signal generator 460 operative to convert the output signal Y into a period control signal 448 supplied to the signal generator 460.

As its name suggests, the period control signal 448 indicates a respective period P(t) (indicating a switching frequency) in which to generate signals S1 and S2. More specifically, the summer 433 receives signal 432 (which may be a positive or negative value). Via the signal 432, the summer 433 adjusts the nominal switching frequency 438 (such as T0) to produce signal Z.

As further shown, the voltage controlled oscillator 440 converts the signal Z into the (switching period) signal 448 based on a magnitude of the signal Z. Signal 448 indicates a respective period (a.k.a., SWGPERIOD) and/or switching frequency to generate the switch control signals S1 and S2. The signal generator 460 uses the signal 448 such as P(t) as a basis in which to control the period (or switching frequency) associated with generating the signals S1 and S2.

Accordingly, techniques as discussed herein include the controller 140 in which the error voltage 418 (e(t) is processed by a first control loop function (such as PID controller 420) to produce signal X such as pid(t). The controller 140 is operative to apply a second control loop function (such as gain stage 430) to convert signal X into signal Y (signal 432); the second control loop function can be configured to include an inverse function 1/X. The signal Y is a frequency adjustment signal derived from e(t).

The summer 433 receives a nominal switching frequency value 438 (derived from nominal switching period value T0). The controller 140 adjusts (such as sums) a magnitude of the nominal switching frequency value 438 and the signal 432 (as discussed herein signal) to produce the derived control frequency/period setting as captured by signal Z. For example, the controller 140 produces signal Z based on a combination of the nominal switching frequency value 438 and the adjustment signal Y.

The controller 140 then implements a third control loop function (such as voltage controlled oscillator or voltage controlled oscillation function) to convert signal Z into signal into a derived control period setting or frequency setting. The signal generator 460 generates the signals based on the selected period setting or frequency setting as specified by the signal 448.

Note again that implementation of the inverse function in the gain stage 430 provides a non-linear frequency response of controlling the control signals S1 and S2 based on the changes in the error voltage 418.

Figure 5:
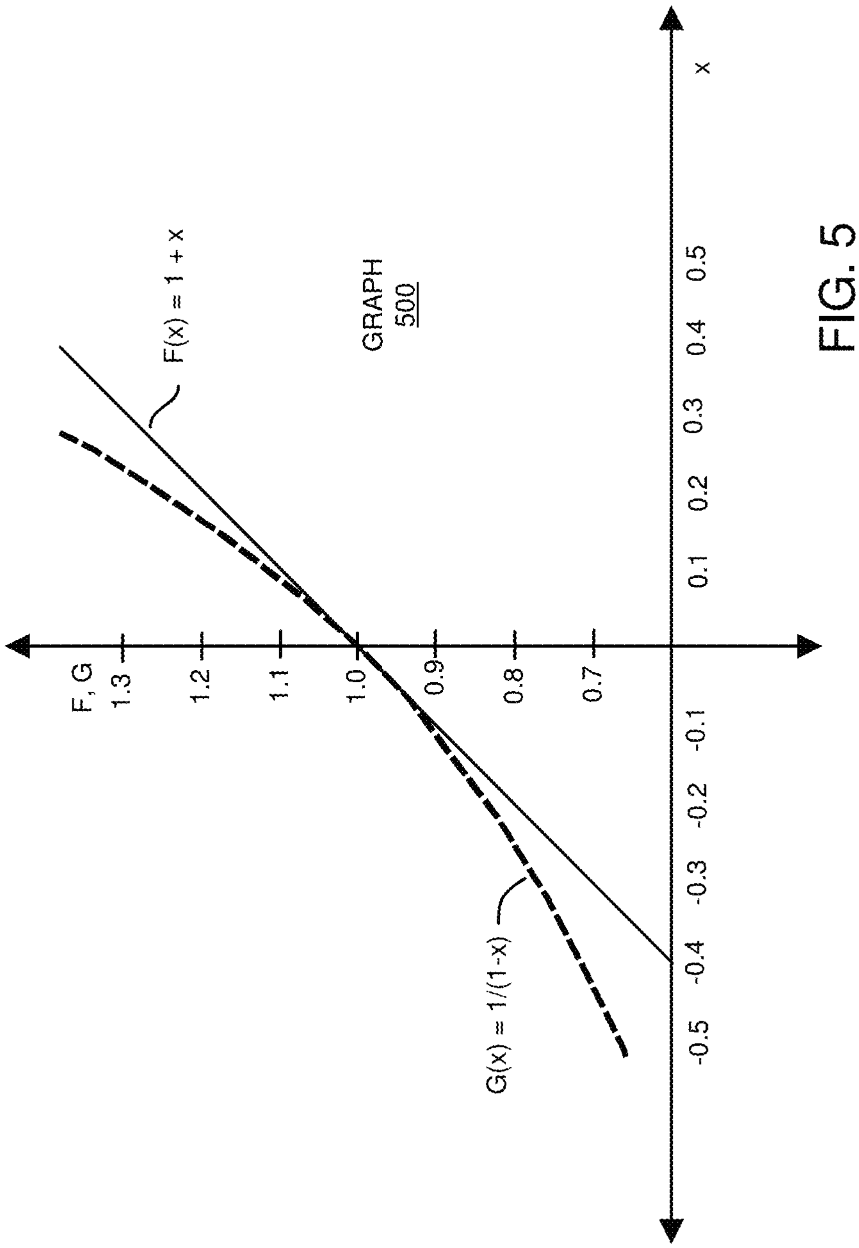
FIG. 5 is an example diagram illustrating a linear function and a non-linear function as discussed herein.

FIG. 5 is an example diagram illustrating a linear function and a non-linear function as discussed herein.

In graph 500, the function F(x) is a linear function; the function G(x) is a non-linear function.

Figure 6:
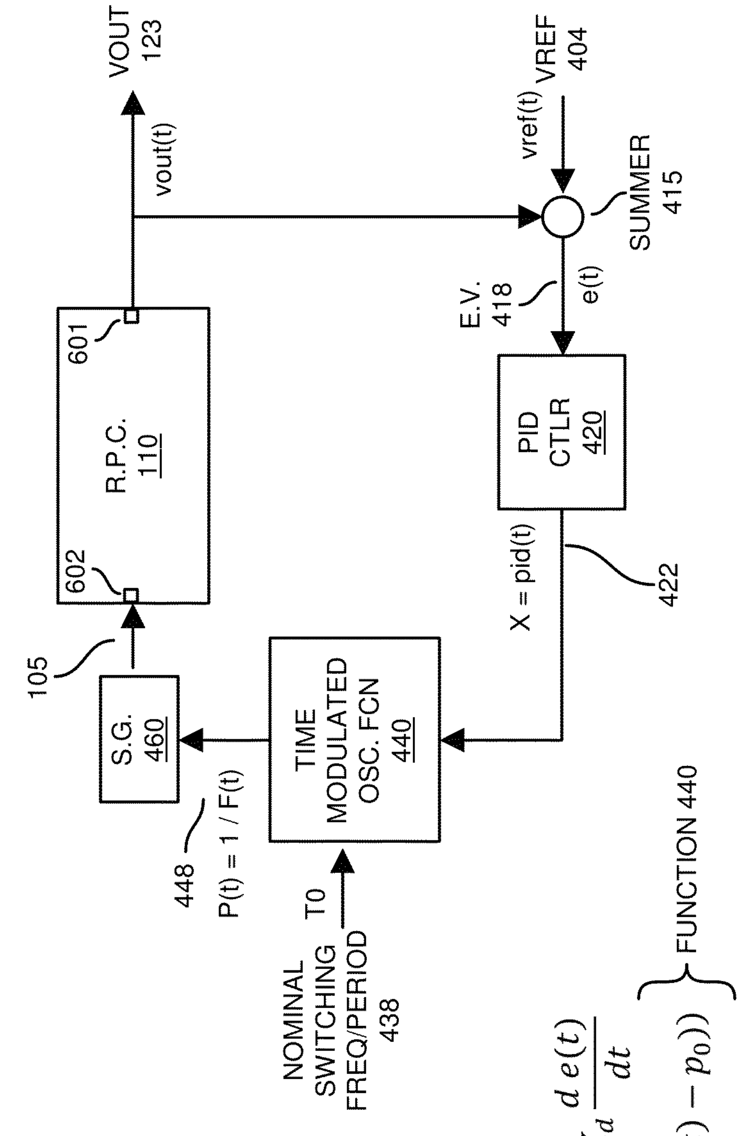
FIG. 6 is an example more specific detailed diagram illustrating an example resonant power converter and controller implementing switching period modulation as discussed herein.

FIG. 6 is an example more specific detailed diagram illustrating an example resonant power converter and controller implementing period modulation as discussed herein.

In this example, the power supply 100 includes a respective feedback loop such as circuit path from node 601 to node 602. The feedback loop associated with controller 140 in this example includes summer 415, PID controller 420 (such as a linear PID or Proportional-Integral-Derivative stage where P=Proportional component, I=Integral component, D=Derivative component), time modulation oscillation function 440, and signal generator 460. In a manner as previously discussed, the PID controller 420 implements coefficients $K_P$, $K_I$, and $K_D$ to convert the error voltage 418 into the output signal 422 (signal X such as PID output voltage, processed error voltage, filtered signal, etc.).

Via the feedback control loop, the summer 415 (first control loop function) produces a respective error voltage 418 (a.k.a., error signal e(t)) based on VOUT-VREF, where VREF is signal 404. In general, as further discussed herein, the magnitude of the error voltage 418 is converted into a respective control period setting 448 to produce control signal S1 and control signal S2 used to control respective switches Q1-Q4.

As further shown, the PID controller 420 such as a second control loop function produces the respective signal 422 (such as signal X or pid(t) or PID output voltage). The feedback control loop further includes time modulated oscillation function 440 to convert the received signal X or pid(t) into the signal 448 or selected period setting such as P(t).

As previously discussed, signal 448 indicates a respective period (a.k.a., SWGPERIOD) and/or switching frequency to generate the switch control signals S1 and S2. The signal generator 460 uses the signal 448 such as P(t) (selected period setting) as a basis in which to control the period (or switching frequency) associated with generating the signals S1 and S2.

Figure 7:
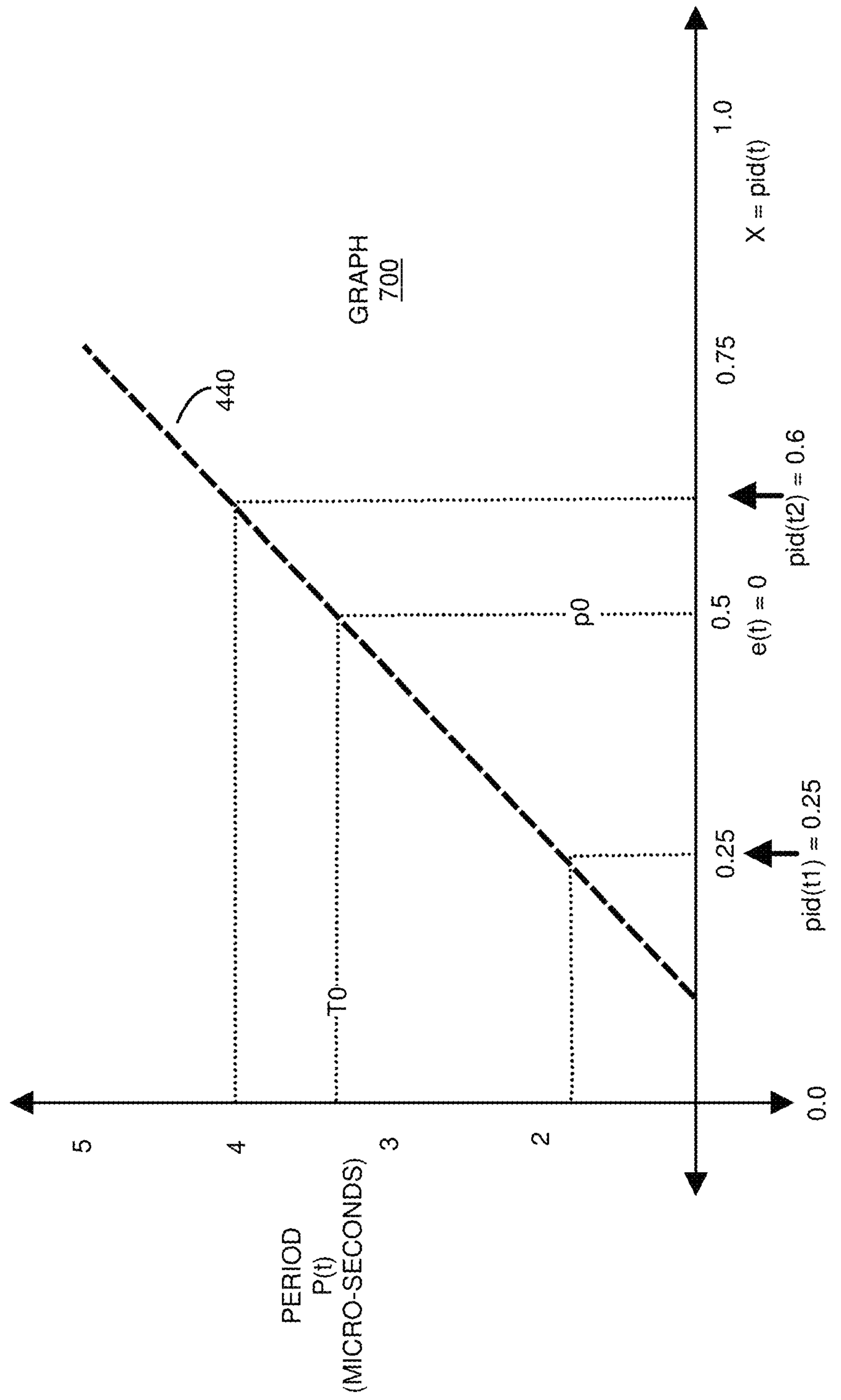
FIG. 7 is an example graph of a linear function mapping PID output values versus switching period modulation values as discussed herein.

An example mathematical representation of the function 440 is shown FIG. 7.

FIG. 7 is an example graph illustrating PID output versus period as discussed herein.

In this example, the x-axis represents X or pid(t) generated by the PID controller 420. The nominal output (p0) of the PID controller 420 is 0.5, corresponding to a condition in which the error voltage is 0 (i.e., Vout=Vref). The nominal PID output p0 corresponds to a nominal period setting of T0. As previously discussed, the magnitude of pid(t) varies depending on changes in the error voltage e(t).

For example, during a first condition in which the PID controller 420 produces pid(t1)=0.25, where t1=a first instance of time, the controller 140 and corresponding function 440 maps the value 0.25 to a period setting of 1.8 microseconds. The signal generator 460 uses the selected period setting 1.8 microseconds to set the SWGFREQ associated with signals S1 and S2 for one or more control cycles.

During a second condition in which the PID controller 420 produces pid(t2)=0.6, where t2=a second instance of time, the function 440 maps the value 0.6 to a period setting of 4 microseconds. The signal generator 460 uses the selected period setting 4 microseconds to set the SWGFREQ associated with signals S1 and S2.

Accordingly, the function 440 repeatedly adjusts the magnitude of the switching frequency SWGFREQ depending on conversion of the signal X or pid(t) into a corresponding period setting. Function 440 provides a linear conversion of the signal pid(t) into respective period settings.

Figure 8:
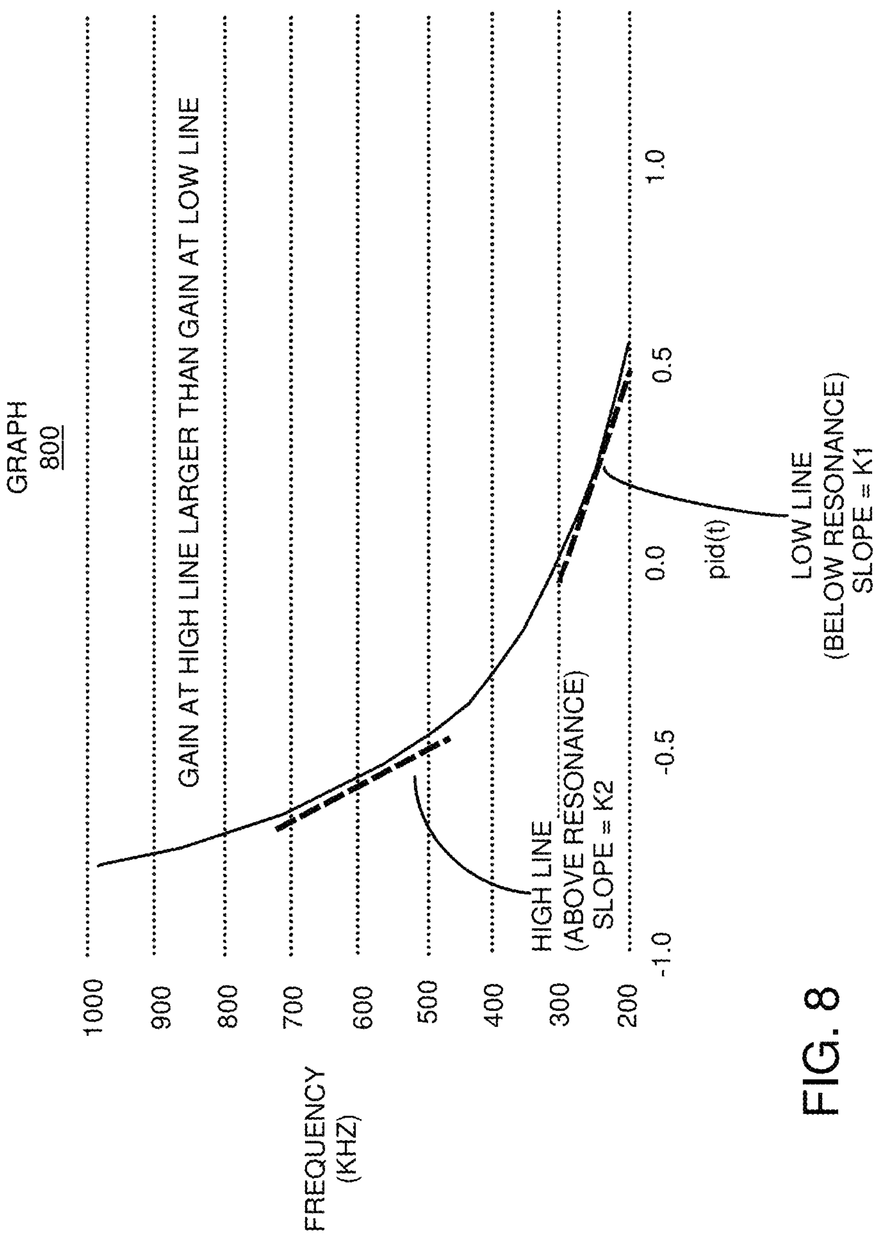
FIG. 8 is an example graph illustrating PID output versus non-linear frequency control as discussed herein.

FIG. 8 is an example graph illustrating PID output versus frequency control as discussed herein.

According to one example, to optimize the overall gain associated with the controller 140 (such as based on the PID controller and voltage controlled oscillator transfer function), it's desirable to have lower controller gain for below resonance operation (resonance at less than peak resonance) and higher gain for above resonance operation (resonance at greater than peak resonance) of the resonant power converter 110. Time modulation as discussed herein achieves this. With the inversely varying gain of voltage controlled oscillator, time modulation achieves better performance than frequency modulation across the line range.

If time modulation and frequency modulation achieve similar performance at low line (by adjusting PID to achieve this), at high line as shown in graph 800, time modulation has faster response (lower overshoot), because the gain of voltage controlled oscillator is automatically increased at high line (k2>k1) in time modulation. In contrast, VCO gain is not changing in frequency modulation. If time modulation and frequency modulation achieve similar performance at high line (by adjusting PID to achieve this), at low line as shown in graph 800, frequency modulation will have oscillations, because the total gain in frequency modulation is too high for low line. In contrast, the gain in time modulation can automatically decrease at low line, showing no oscillation at low line. From another point of view, given a model of LLC converter, below resonance operation has larger gain and easier to oscillate, compared to above resonance operation. This could be an advantage of digital controller, as digital controller can easily realize a linear control to period conversion. In analog control, typically a VCO (voltage controlled oscillator) is used, where frequency is directly controlled by voltage.

Figure 9:
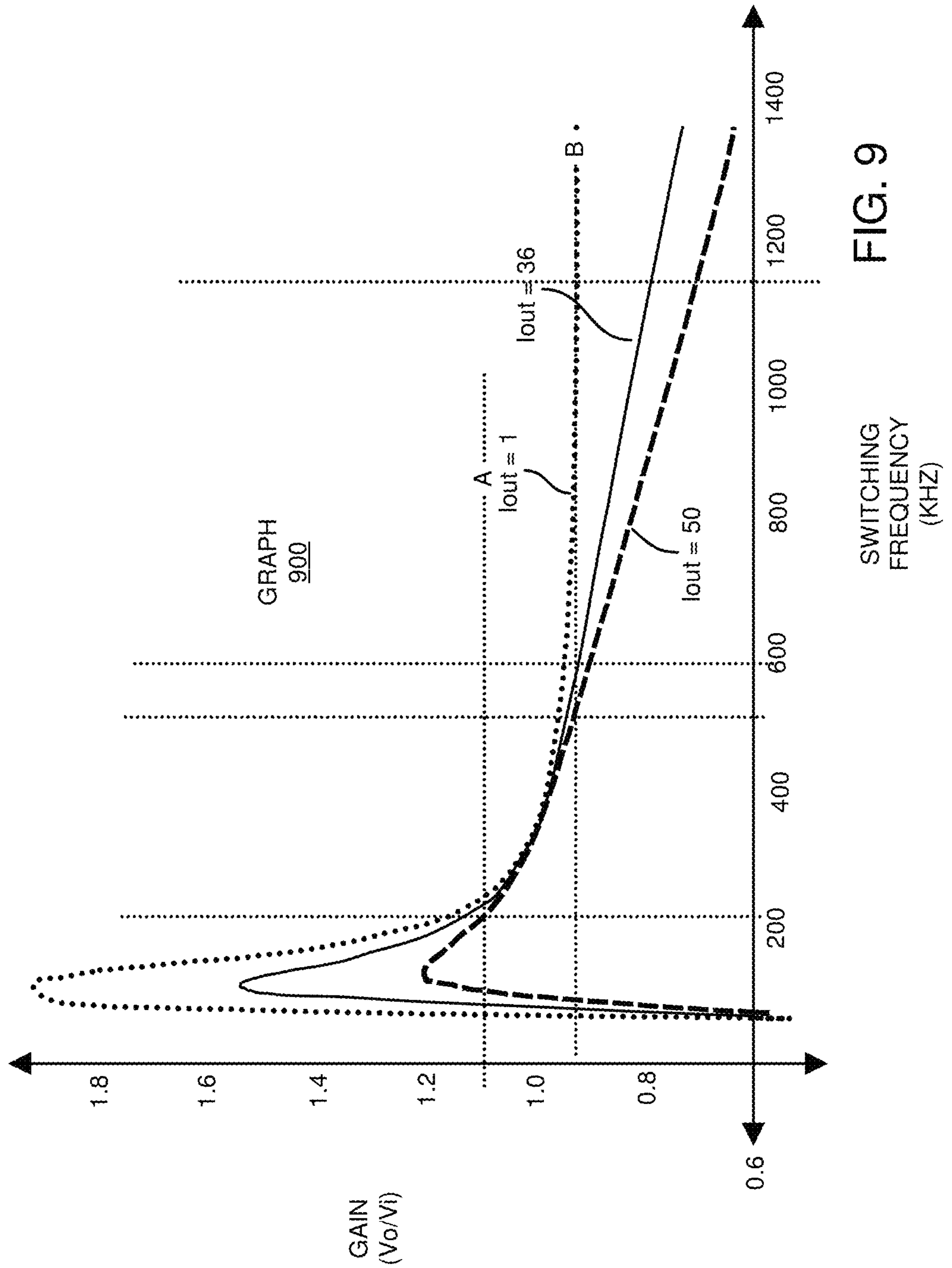
FIG. 9 is an example graph illustrating switching frequency claim versus gain control for different levels of current consumption as discussed herein.

FIG. 9 is an example graph illustrating frequency versus gain control for different levels of current consumption as discussed herein.

Graph 900 (plot) illustrates LLC characteristic gain curves associated with the resonant power converter 110, which is a function of the power stage. To maintain constant Vout over varying Vin (i.e., a magnitude of the input voltage may vary within a range) at a given load, such as Iload=50 Amps, the controller 140 varies the switching frequency of producing the control signals S1 and S2 along the curve associated with Iout=50.

To maintain a constant magnitude of the output voltage Vout over varying Iload at constant input voltage Vin setting, the control 140 varies a magnitude of the switching frequency along line A for low magnitudes of the input voltage Vin. Conversely, the controller 140 varies a magnitude of the switching frequency along line B for high magnitudes of the input voltage Vin.

Figure 10:
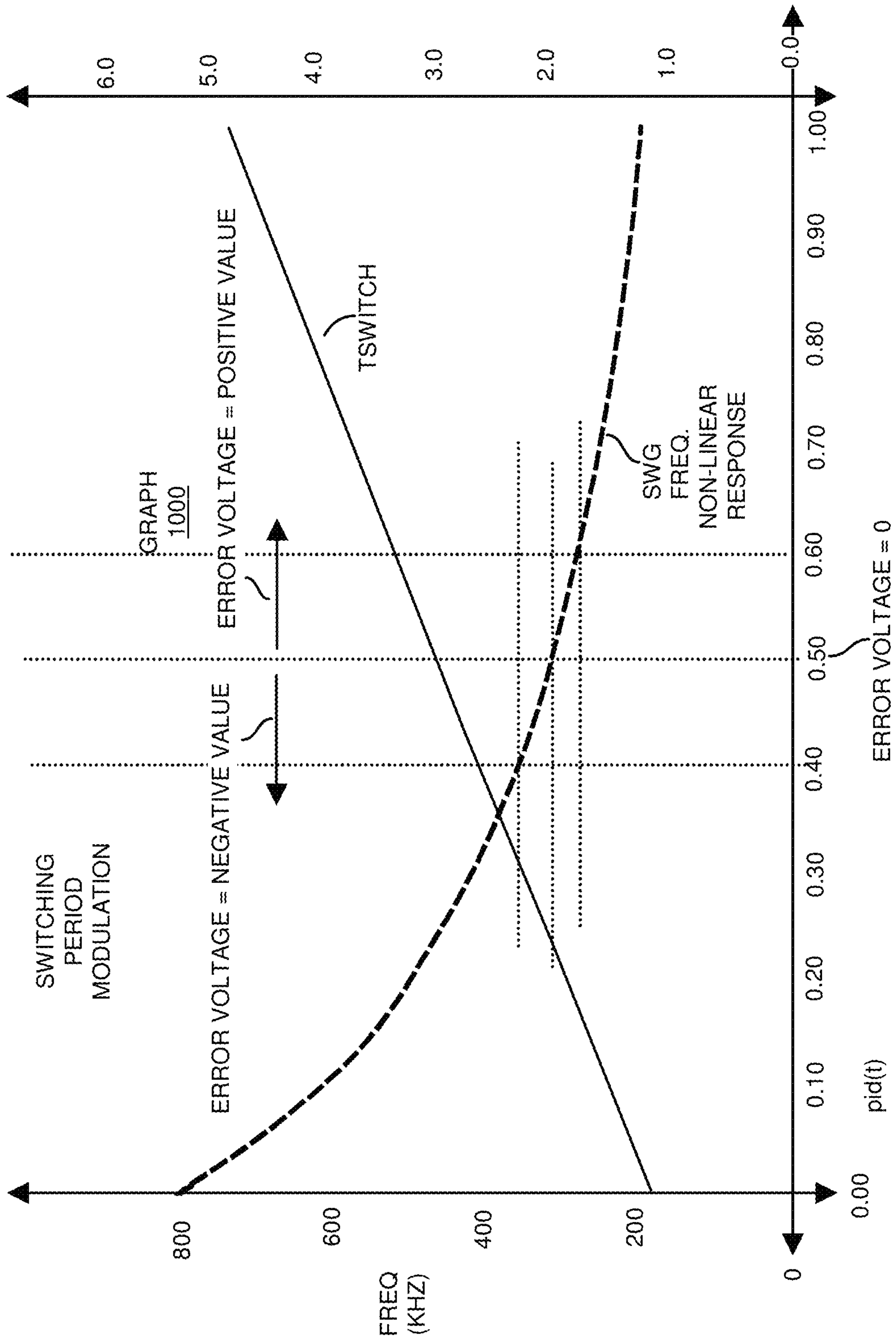
FIG. 10 is an example graph illustrating PID output versus non-linear frequency response control as discussed herein.

FIG. 10 is an example graph illustrating PID output versus non-linear frequency control as discussed herein.

Graph 1000 indicates a selected switching frequency of the gain (Vout/Vin) of the resonant power converter 110 for different pid(t) values for different output currents outputted from the resonant power converter 110. As previously discussed, the PID controller 420 generates the output X=pid(t) to be 0.5 when the corresponding error voltage 418 (a.k.a., error signal) is zero (no error because the magnitude of the output voltage 123=a magnitude of the reference voltage VREF). The setting of pid(t) is greater or less than the value 0.5 depending on a polarity of the error voltage.

Accordingly, graph 1000 illustrates linear modulation of period with respect to the PID output pid(t). The slope of the frequency with respect to the PID output is higher at high frequencies. In other words, this results in a non-linear gain response with respect to the PID output pid(t). Thus, as discussed herein, the controlled switching of the switches Q1-Q4 in the resonant power converter 110 in accordance with the derived control period setting (as specified by signal 448) is operative to provide non-linear frequency gain of regulating a magnitude of the output voltage 123 with respect to changes in the error voltage e(t). As previously discussed, the non-linear frequency gain (as captured by graph 1000) of regulating the magnitude of the output voltage 123 based on the error voltage 418 or e(t) is operative to provide lower control loop gain for below-resonance operation of the resonant power converter 110 and higher control loop gain for above-resonance operation of the resonant power converter 110.

Figure 11:
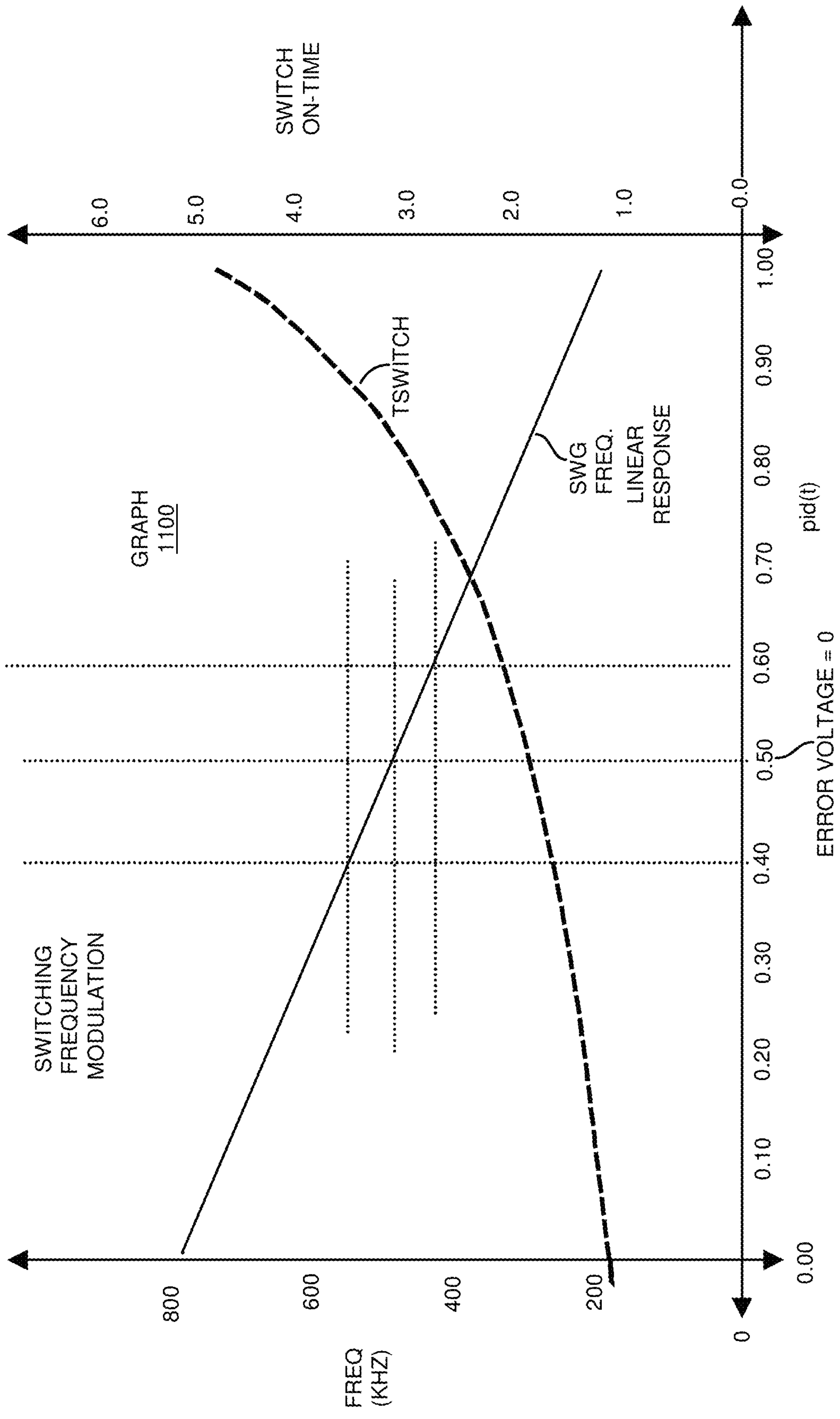
FIG. 11 is an example graph illustrating PID output versus linear frequency control as discussed herein.

FIG. 11 is an example graph illustrating PID output versus linear frequency control as discussed herein.

Graph 110 illustrates an example implementation of a linear switching frequency response with respect to pid(t).

Figure 12:
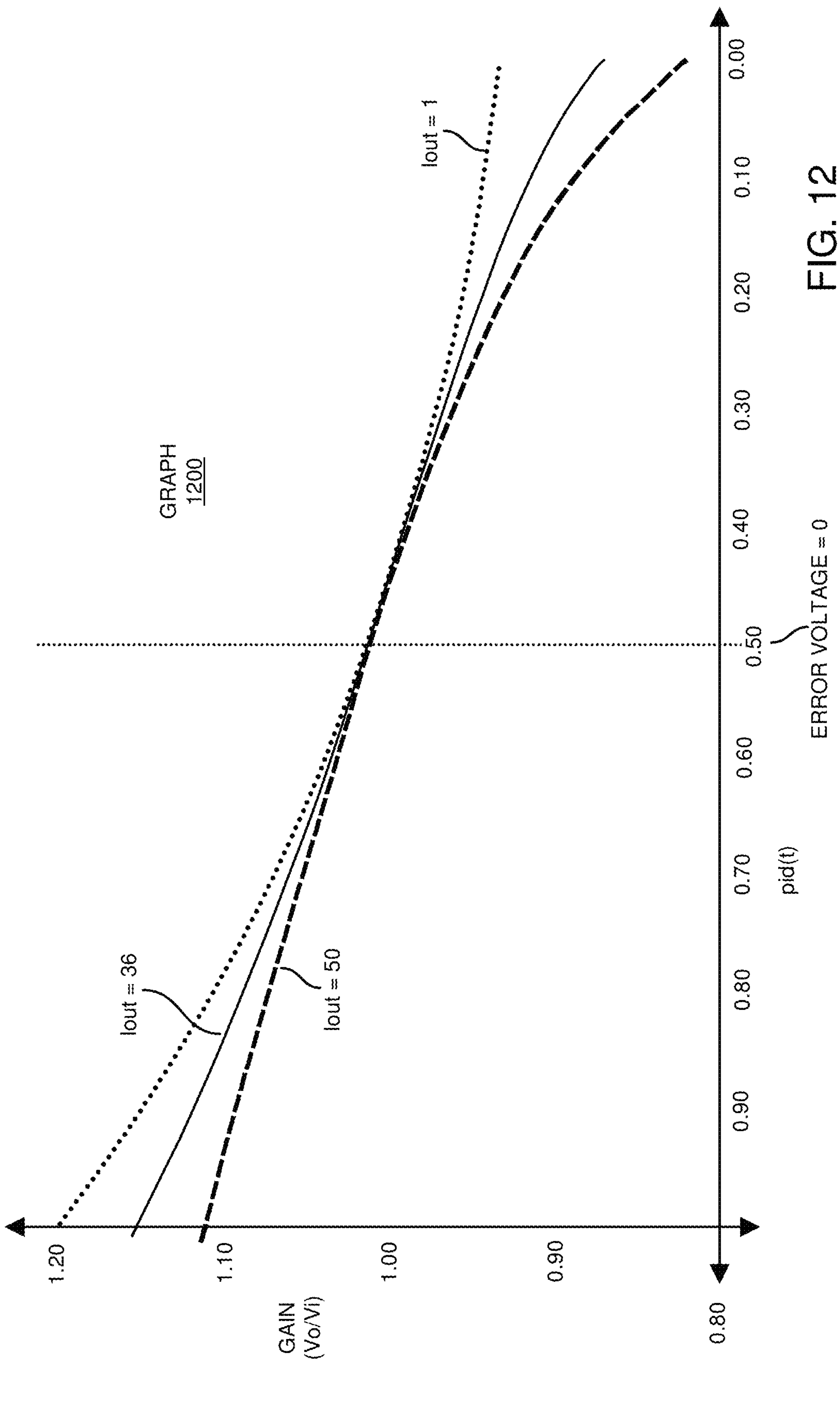
FIG. 12 is an example graph illustrating switching frequency versus gain versus for different levels of current consumption as discussed herein.

FIG. 12 is an example graph illustrating gain versus PID output for different levels of current consumption as discussed herein.

Graph 1200 is a plot of a gain curve with respect to the PID output for period modulation/control as discussed herein. As shown, the period modulation response with respect to the PID output pid(t) is more linear or linear, which leads to improved dynamic performance in particular when operating at the higher frequency (lower gain) region of the curve.

More specifically, graph 1200 indicates gain (Vout/Vin) of the resonant power converter 110 for different pid(t) values for different output currents outputted from the resonant power converter 110. As previously discussed, the PID controller 420 generates the output X=pid(t) to be 0.5 when the corresponding error voltage 418 (a.k.a., error signal) is zero (no error because the magnitude of the output voltage 123=a magnitude of the reference voltage VREF).

Figure 13:
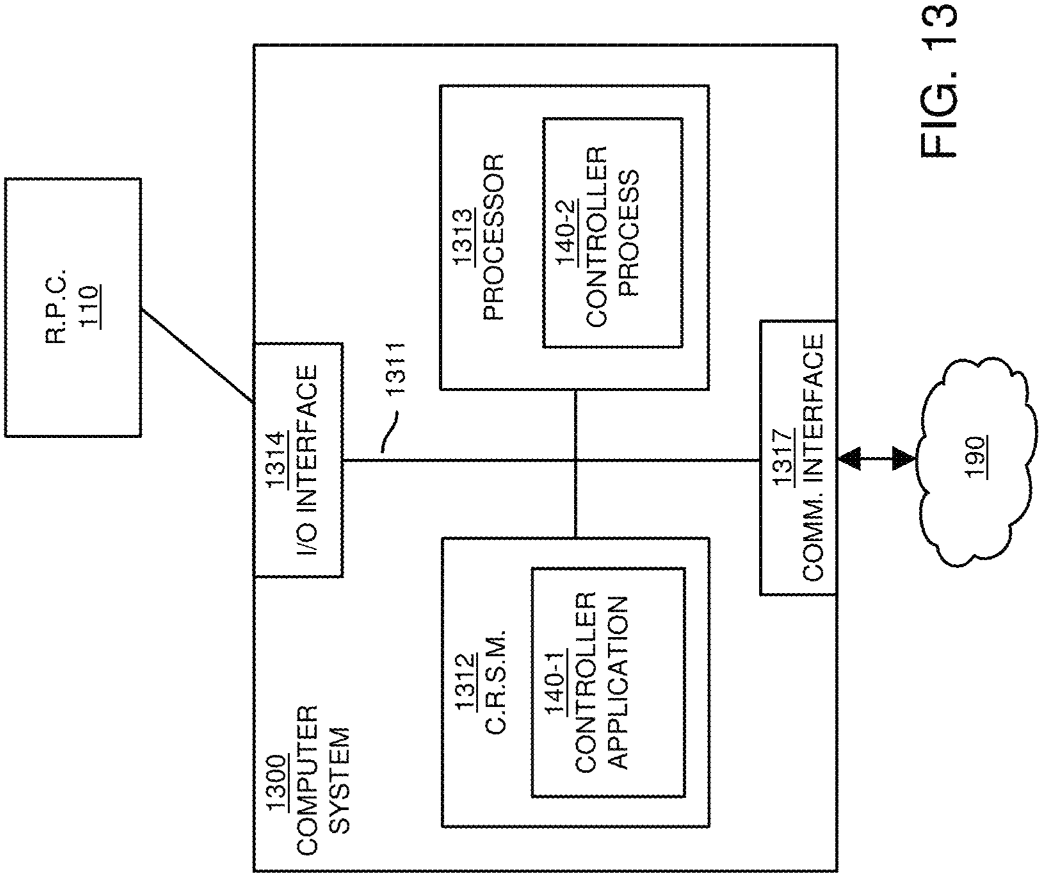
FIG. 13 Is an example diagram illustrating computer processor hardware and related software instructions that execute methods as discussed herein.

FIG. 13 is an example diagram illustrating computer processor hardware and related software instructions that execute methods as discussed herein.

As shown in this example, computer system 1300 and control application 140-1 (such as implemented by the controller 140 or other suitable entity) of the present example includes an interconnect 1311 that couples computer readable storage media 1312 such as a non-transitory type of media or computer-readable storage hardware or simply hardware storage in which digital information can be stored and retrieved, a processor 1313 (e.g., computer processor hardware such as one or more processor devices), I/O interface 1314, and a communications interface 1317.

I/O interface 1314 provides connectivity to any suitable circuitry such as resonant power converters.

Computer readable storage medium 1312 can be any hardware storage resource or device such as memory, optical storage, hard drive, floppy disk, etc. In one example, the computer readable storage medium 1312 stores instructions and/or data used by the control application 140-1 to perform any of the operations as described herein.

Further in this example, communications interface 1317 enables the computer system 1300 and processor 1313 to communicate over a resource such as network 190 to retrieve information from remote sources and communicate with other computers.

As shown, computer readable storage media 1312 (such as computer readable hardware) is encoded with application 140-1 (e.g., software, firmware, etc.) executed by processor 1313. Application 140-1 can be configured to include instructions to implement any of the operations as discussed herein.

During operation of one example, processor 1313 accesses computer readable storage media 1312 via the use of interconnect 1311 in order to launch, run, execute, interpret or otherwise perform the instructions in application 140-1 stored on computer readable storage medium 1312.

Execution of the application 140-1 produces processing functionality such as process 140-2 in processor 1313. In other words, the process 140-2 associated with processor 1313 represents one or more aspects of executing application 140-1 within or upon the processor 1313 in the computer system 1300.

In accordance with different examples, note that computer system 1300 can be a micro-controller device, logic, hardware processor, hybrid analog/digital circuitry, etc., configured to control a power supply and perform any of the operations as described herein.

Functionality supported by the different resources will now be discussed via flowchart in FIG. 14. Note that the steps in the flowcharts below can be executed in any suitable order.

Figure 14:
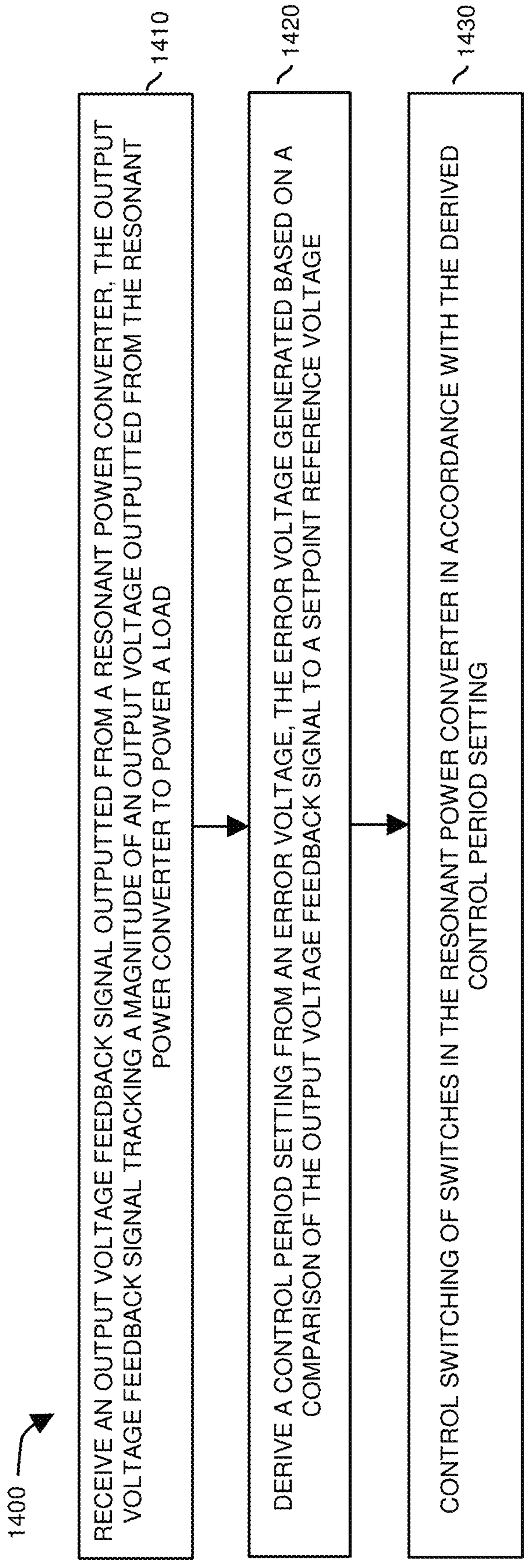
FIG. 14 is an example diagram illustrating a method as discussed herein.

FIG. 14 is an example diagram illustrating a method of controlling a switch based on monitored current according to examples herein.

In processing operation 1410, a controller 140 receives an output voltage feedback signal 123-FB outputted from a resonant power converter 110. The output voltage feedback signal 123-FB tracks a magnitude of an output voltage 123 outputted from the resonant power converter 110 to power a load 118.

In processing operation 1420, the controller 140 derives a control period setting P(t) from an error voltage 418 such as e(t). The error voltage 418 is generated based on a comparison of the output voltage feedback signal 123-FB (such as output voltage 123) to a setpoint reference voltage Vref(t).

In processing operation 1430, the controller 140 controls switching of switches 121 (such as switches Q1, Q2, Q3, and Q4) in the resonant power converter 110 in accordance with the derived control period setting P(t).

Note again that techniques herein are well suited for adjusting a respective resonant frequency associated with each of one or more resonant power converters. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

The invention claimed is:

1. An apparatus comprising:

a controller operative to:

receive an output voltage feedback signal outputted from a resonant power converter, the output voltage feedback signal tracking a magnitude of an output voltage outputted from the resonant power converter to power a load;

derive a control period setting from an error voltage, the error voltage generated based on a comparison of the output voltage feedback signal to a setpoint reference voltage, a magnitude of the control period setting derived based at least in part on an inverse function disposed in a feedback control loop receiving the error voltage;

wherein the inverse function is operative to control a gain applied to a filtered error voltage value generated by a control function disposed in the feedback control loop, the control function operative to derive the filtered error voltage value from the error voltage; and control switching of switches in the resonant power converter in accordance with the derived control period setting.

2. The apparatus as in claim 1, wherein the controlled switching of the switches in the resonant power converter in accordance with the derived control period setting is operative to provide non-linear frequency gain of regulating a magnitude of the output voltage with respect to changes in the error voltage.

3. The apparatus as in claim 2, wherein the non-linear frequency gain of regulating the magnitude of the output voltage based on the error voltage is operative to provide lower control loop gain for below-resonance operation of the resonant power converter and higher control loop gain for above-resonance operation of the resonant power converter.

4. The apparatus as in claim 1, wherein a conversion of the error voltage into the derived control period setting is operative to provide a non-linear frequency response of controlling the switches in the resonant power converter.

5. The apparatus as in claim 1, wherein the inverse function is operative to: i) receive the filtered error voltage as signal X, wherein the control function is a PID (Proportional-Integral-Derivative) function producing the signal X, and ii) output a signal Y from the inverse function, the output signal Y=K/X, where K is a selected gain value.

6. The apparatus as in claim 5, wherein the feedback control loop further includes a voltage controlled oscillator function operative to derive the control period setting of controlling the switches based at least in part on the signal Y and a nominal switching frequency setting.

7. The apparatus as in claim 1, wherein the controller is further operative to:

receive a nominal switching frequency value; and adjust a magnitude of the nominal switching frequency value to produce the derived control period setting based on a received adjustment signal Y derived at least in part from the error voltage.

8. The apparatus as in claim 7, wherein the inverse function is a second control loop function disposed in the feedback loop; and wherein the error voltage is processed by the control function in the feedback control loop to produce the filtered error voltage value as a signal X.

9. The apparatus as in claim 8, wherein the controller is operative to implement the control function to convert the signal X into the adjustment signal Y.

10. The apparatus as in claim 9, wherein the controller is further operative to:

produce a signal Z based on a combination of the nominal switching frequency setting value and the adjustment signal Y.

11. The apparatus as in claim 10, wherein the controller is further operative to apply a voltage controlled oscillator function to convert the signal Z into the derived control period setting, the third control function disposed in the feedback control loop.

12. The apparatus as in claim 1, wherein the controller is operative to implement: i) the control function disposed in the feedback control loop as a PID (Proportional-Integral-Derivative) control function, the PID control function operative to convert the error voltage into the filtered error voltage, and ii) a linear conversion function disposed in the feedback control loop to convert the filtered error voltage into the control period setting, the linear conversion function including the inverse function.

13. The apparatus as in claim 12, wherein the linear conversion function is operative to map different settings of the filtered error voltage to different magnitudes of the control period setting.

14. The apparatus as in claim 1, wherein the gain applied to the filtered error voltage value is operative to produce a control signal configured to control the magnitude of the control period setting.

15. An apparatus comprising:

a controller operative to:

receive an output voltage feedback signal outputted from a resonant power converter, the output voltage feedback signal tracking a magnitude of an output voltage outputted from the resonant power converter to power a load;

derive a control period setting from an error voltage, the error voltage generated based on a comparison of the output voltage feedback signal to a setpoint reference voltage, a magnitude of the control period setting derived based at least in part on an inverse function disposed in a feedback control loop receiving the error voltage;

control switching of switches in the resonant power converter in accordance with the derived control period setting;

wherein the feedback control loop further includes a PID (Proportional-Integral-Derivative) function operative to receive the error voltage and convert the error voltage into a first signal supplied to the inverse function; and wherein the inverse function is operative to convert the received first signal into a second signal, the second signal being an adjustment signal.

16. The apparatus as in claim 15, wherein the feedback control further comprises:

a summer operative to: i) receive a nominal switching frequency value and the second signal, and ii) modify the nominal switching frequency value based on the received adjustment signal to produce the derived control period setting.

17. The apparatus as in claim 16, wherein the controlled switching of the switches in the resonant power converter in accordance with the derived control period setting is operative to provide non-linear frequency gain of regulating a magnitude of the output voltage with respect to changes in the error voltage.

18. The apparatus as in claim 17, wherein the non-linear frequency gain of regulating the magnitude of the output voltage based on the error voltage is operative to provide lower control loop gain for below-resonance operation of the resonant power converter and higher control loop gain for above-resonance operation of the resonant power converter.

19. A method comprising:

receiving an output voltage feedback signal from a resonant power converter, the output voltage feedback signal indicating a magnitude of an output voltage powering a load;

deriving a control period from an error voltage, the error voltage generated based on a comparison of the output voltage feedback signal to a setpoint reference voltage, a magnitude of the control period setting derived at least in part via an inverse function disposed in a feedback control loop receiving the output voltage feedback signal;

controlling switching of switches in the resonant power converter in accordance with the derived control period;

wherein the controlled switching of the switches in the resonant power converter in accordance with the derived control period setting is operative to provide non-linear frequency gain of regulating a magnitude of the output voltage with respect to changes in the error voltage; and wherein the non-linear frequency gain of regulating the magnitude of the output voltage based on the error voltage is operative to provide lower control loop gain for below-resonance operation of the resonant power converter and higher control loop gain for above-resonance operation of the resonant power converter.

20. Non-transitory computer readable storage media having instructions stored thereon, the instructions, when carried out by computer processor hardware, cause the computer processor hardware to:

receive an output voltage feedback signal outputted from a resonant power converter, the output voltage feedback signal tracking a magnitude of an output voltage outputted from the resonant power converter to power a load;

derive a control period setting from an error voltage, the error voltage generated based on a comparison of the output voltage feedback signal to a setpoint reference voltage, a magnitude of the control period setting derived at least in part via an inverse function disposed in a feedback control loop receiving the error voltage;

wherein the inverse function is operative to control a gain applied to a filtered error voltage value generated by a control function disposed in the feedback control loop, the control function operative to derive the filtered error voltage value from the error voltage; and control switching of switches in the resonant power converter in accordance with the derived control period setting.

* * * * *